(12) United States Patent
Ponnuru et al.

(10) Patent No.: US 12,074,913 B2
(45) Date of Patent: *Aug. 27, 2024

(54) CERTIFICATE AUTHORIZATION POLICY FOR SECURITY PROTOCOL AND DATA MODEL CAPABLE DEVICES

(71) Applicant: DELL PRODUCTS L.P., Round Rock, TX (US)

(72) Inventors: Viswanath Ponnuru, Bangalore (IN); Rama Rao Bisa, Bangalore (IN); Chandrashekar Nelogal, Round Rock, TX (US); Chandrasekhar Mugunda, Austin, TX (US); Lee Eric Ballard, Georgetown, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/985,484

(22) Filed: Nov. 11, 2022

(65) Prior Publication Data
US 2023/0071552 A1 Mar. 9, 2023

Related U.S. Application Data

(63) Continuation of application No. 16/879,058, filed on May 20, 2020, now Pat. No. 11,516,256.

(51) Int. Cl.
*H04L 29/06* (2006.01)
*H04L 9/32* (2006.01)
*H04L 9/40* (2022.01)

(52) U.S. Cl.
CPC ............ *H04L 63/20* (2013.01); *H04L 9/3263* (2013.01); *H04L 63/10* (2013.01); *H04L 63/101* (2013.01)

(58) Field of Classification Search
CPC ..... H04L 63/20; H04L 9/3263; H04L 63/101; H04L 63/10; H04L 63/14; H04L 63/145
USPC ............................................................ 726/1
See application file for complete search history.

(56) References Cited

U.S. PATENT DOCUMENTS

| 7,333,482 | B2 * | 2/2008 | Johansson ............... H04L 45/54 |
| | | | 455/445 |
| 7,603,422 | B2 * | 10/2009 | Murphy ............... G06Q 10/107 |
| | | | 709/206 |
| 8,312,177 | B2 | 11/2012 | Kotzur et al. |
| 8,539,116 | B2 | 9/2013 | Kotzur et al. |
| 8,726,070 | B2 | 5/2014 | Nelogal et al. |
| 8,938,584 | B2 | 1/2015 | Nelogal et al. |

(Continued)

OTHER PUBLICATIONS

DMTF-SPDM Specification (Document Version 0.99.0a of the Distributed Management Task Force—Security Policy Data model Specification (Oct. 18, 2019).

*Primary Examiner* — Longbit Chai
(74) *Attorney, Agent, or Firm* — Jackson Walker LLP; Christopher J. Rourk

(57) ABSTRACT

A system for data processing, comprising a management controller operating on a processor and configured to load and execute one or more algorithms that provide the function of transmitting a request to a managed device using a Security Protocol and Data Model (SPDM) protocol and to receive a response from the managed device. A system management bus and security policy system operating on the processor is configured to execute one or more algorithms to process the response from the managed device to apply an SPDM security policy to the response.

20 Claims, 3 Drawing Sheets

(56) References Cited

U.S. PATENT DOCUMENTS

| | | |
|---|---|---|
| 8,996,751 B2 | 3/2015 | Pereira et al. |
| 9,077,761 B2 | 7/2015 | Nelogal et al. |
| 9,104,598 B2 | 8/2015 | Nelogal et al. |
| 9,501,441 B2 | 11/2016 | Nelogal et al. |
| 9,529,674 B2 | 12/2016 | Pereira et al. |
| 9,600,378 B2 | 3/2017 | Nelogal et al. |
| 10,007,638 B2 | 6/2018 | Nelogal et al. |
| 10,146,632 B2 | 12/2018 | Nelogal et al. |
| 10,146,718 B2 | 12/2018 | Nelogal et al. |
| 10,282,220 B2 | 5/2019 | Koladi et al. |
| 10,303,560 B2 | 5/2019 | Nelogal et al. |
| 10,437,270 B2 | 10/2019 | Kwon et al. |
| 10,437,477 B2 | 10/2019 | Nelogal et al. |
| 10,521,318 B2 | 12/2019 | Nelogal et al. |
| 10,558,453 B1 | 2/2020 | Bhaskar et al. |
| 2011/0010543 A1* | 1/2011 | Schmidt ............... H04W 12/06 713/168 |
| 2012/0079136 A1 | 3/2012 | Kotzur et al. |
| 2012/0079317 A1 | 3/2012 | Nelogal et al. |
| 2012/0207155 A1 | 8/2012 | Nelogal et al. |
| 2013/0060968 A1 | 3/2013 | Kotzur et al. |
| 2013/0290608 A1 | 10/2013 | Nelogal et al. |
| 2014/0195711 A1 | 7/2014 | Bhatia et al. |
| 2014/0201396 A1 | 7/2014 | Pereira et al. |
| 2014/0372697 A1 | 12/2014 | Pereira et al. |
| 2014/0372793 A1 | 12/2014 | Nelogal et al. |
| 2015/0169331 A1 | 6/2015 | Nelogal et al. |
| 2016/0034012 A1 | 2/2016 | Sahu et al. |
| 2016/0224437 A1 | 8/2016 | Nelogal et al. |
| 2016/0241432 A1 | 8/2016 | Vidyadhara et al. |
| 2016/0343103 A1 | 11/2016 | Puthillathe et al. |
| 2016/0352856 A1 | 12/2016 | Devarapalli et al. |
| 2016/0371107 A1 | 12/2016 | Puthillathe et al. |
| 2017/0026306 A1 | 1/2017 | Narayanan et al. |
| 2017/0061572 A1 | 3/2017 | Puthillathe et al. |
| 2017/0075841 A1 | 3/2017 | Nelogal et al. |
| 2017/0104770 A1 | 4/2017 | Jreij et al. |
| 2017/0132169 A1 | 5/2017 | Nelogal et al. |
| 2017/0134310 A1 | 5/2017 | Koladi et al. |
| 2017/0161154 A1 | 6/2017 | Nelogal et al. |
| 2017/0243021 A1 | 8/2017 | Gupta et al. |
| 2017/0270060 A1 | 9/2017 | Gupta et al. |
| 2017/0337140 A1 | 11/2017 | Ragupathi et al. |
| 2018/0088604 A1 | 3/2018 | Kwon et al. |
| 2018/0232277 A1 | 8/2018 | Nelogal et al. |
| 2018/0287791 A1 | 10/2018 | Basavarajaiah et al. |
| 2018/0314611 A1 | 11/2018 | Puthillathe et al. |
| 2018/0341773 A1 | 11/2018 | Khatri et al. |
| 2019/0026022 A1 | 1/2019 | Nelogal et al. |
| 2019/0114238 A1 | 4/2019 | Nelogal et al. |
| 2019/0188020 A1 | 6/2019 | Ponnuru et al. |
| 2019/0188589 A1 | 6/2019 | Ponnuru et al. |
| 2019/0266053 A1 | 8/2019 | Prasad et al. |
| 2019/0286825 A1 | 9/2019 | Ponnuru et al. |
| 2019/0294352 A1 | 9/2019 | Prasad et al. |
| 2019/0305973 A1* | 10/2019 | Dewan .................. H04L 9/14 |
| 2019/0324514 A1 | 10/2019 | Sahu et al. |
| 2019/0332262 A1 | 10/2019 | Prasad et al. |
| 2019/0332527 A1 | 10/2019 | Ponnuru et al. |
| 2019/0356486 A1 | 11/2019 | Vishwanath et al. |
| 2019/0377647 A1 | 12/2019 | Rao et al. |
| 2020/0019417 A1 | 1/2020 | Puthillathe et al. |
| 2020/0042415 A1 | 2/2020 | Maddukuri et al. |
| 2020/0057568 A1 | 2/2020 | Paitod et al. |
| 2020/0084097 A1 | 3/2020 | Marks et al. |
| 2020/0117533 A1 | 4/2020 | Nijhawan et al. |
| 2020/0133355 A1 | 4/2020 | Bassman et al. |
| 2020/0133538 A1 | 4/2020 | Nelogal et al. |
| 2020/0133568 A1 | 4/2020 | Nelogal et al. |
| 2020/0133759 A1 | 4/2020 | Arzola et al. |
| 2020/0133805 A1 | 4/2020 | Bisa et al. |
| 2020/0133912 A1 | 4/2020 | Gupta et al. |
| 2020/0134192 A1 | 4/2020 | Gupta et al. |
| 2020/0137079 A1 | 4/2020 | Jreij et al. |
| 2020/0142681 A1 | 5/2020 | Marks et al. |
| 2020/0142682 A1 | 5/2020 | Marks et al. |

* cited by examiner

CERTIFICATE AUTHORIZATION POLICY FOR SECURITY PROTOCOL AND DATA MODEL CAPABLE DEVICES

CROSS-REFERENCE TO RELATED APPLICATIONS

The present application is a continuation of U.S. patent application Ser. No. 16/879,058 filed May 20, 2020, which is hereby incorporated by reference for all purposes as if set forth herein in its entirety.

TECHNICAL FIELD

The present disclosure relates generally to data processing, and more specifically to a certificate authorization policy for Security Protocol and Data Model (SPDM) architecture capable devices.

BACKGROUND OF THE INVENTION

The SPDM architecture was prepared by the Platform Management Components Intercommunication (PMCI) Working Group of the Distributed Management Task Force (DMTF) to facilitate secure communication between components of the platform management subsystems. A platform management subsystem can be contained within servers, desktop systems, mobile systems, thin clients, blade systems and other types of devices.

SUMMARY OF THE INVENTION

A system for data processing is provided that includes a management controller operating on a processor that is configured to load and execute one or more algorithms that provide the function of transmitting a request to a managed device using an SPDM protocol, and to receive a response from the managed device. A system management bus and security policy system operating on the processor is configured to execute one or more algorithms to process the response from the managed device to apply an SPDM security policy to the response.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
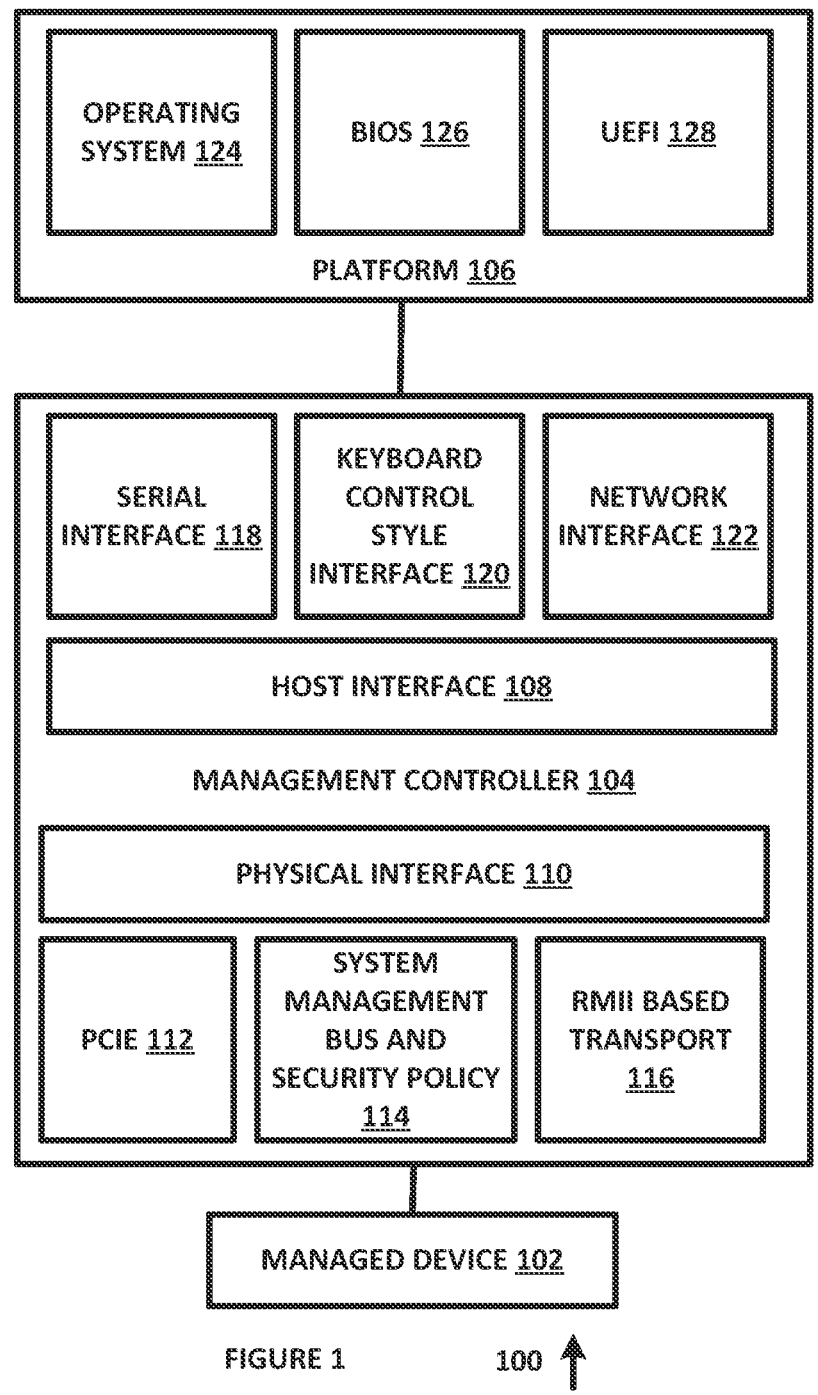
FIG. 1 is a diagram of an information handling system for endpoint device security capabilities discovery, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The SPDM defines a protocol to get a certificate from a component (endpoint device) and authenticate that component via a challenge request, to prove whether the device has a private key associated with the certificate. The DMTF SPDM draft is in the early stages of work and is still in progress, and there are a number of problems with the proposal in the draft. One problem is that SPDM specifications do not define policy or behavior for device identity certificate authorization and verification. Another problem is that devices that either do not support SPDM or devices that have certificates rooted in unknown root certificate authorities (CAs) are a security concern to the initiator (management controller) for authentication and secure communication.

The present disclosure provides a solution that allows management controllers to protect against non-compliant devices and to mitigate risks from malicious firmware/hardware devices that are attempting to exploit a platform management component interconnect communication. The present disclosure includes a number of functional features for a management controller device authentication solution. These include 1) enabling a management controller security policy for storing device certificates and public keys from trusted CAs, 2) extending the system management bus (SMBUS) address resolution protocol (ARP) discovery process to read the device security capabilities and certificate status, and 3) providing generic OEM Platform Level Data Model (PLDM) functions to read the device security capabilities for non-supported SMBUS protocols.

The present disclosure includes a number of example embodiments. In one example embodiment, a management controller security policy is provided. The management controller security policy can be defined for the devices participating in the SPDM authentication model to have the following modes, although different modes or additional modes can also or alternatively be provided: a disable mode, a permissive mode and an enforcing mode. A sample security policy template is provided that includes metadata and whitelist data for the management controller to use to protect against non-compliant device participation. For the disabled mode, the management controller can be silent in regards to security and issue no warnings. For the permissive mode, devices that do not support SPDM can be allowed to interface with the management controller, and for devices that support SPDM and have a CA that is unknown, warnings can be generated. In the event of a challenge failure on devices that support SPDM, the device can be quarantined. For the enforcing mode, devices that do not authenticate successfully in compliance with SPDM with a certificate signed by a known trusted CA can be quarantined. When a device is quarantined, the user can be given an opportunity to either add the root CA for that device to the trusted CA store, or for devices that do not support SPDM the devices can be added to a white list.

In another embodiment, an extension to the SMBUS ARP device discovery process is provided, to discover device security capabilities. This example embodiment includes assuming that a leader/follower protocol has been implemented in the SMBUS and MCTP, with suitable rules. The rules can include 1) that the device certificate can contain the vendor-id and device-id as per the Peripheral Component Interconnect (PCI) Special Interest Group (SIG) specifications, 2) that the device manufacturer's ID (as assigned by the SBS Implementers' Forum or the PCI SIG) is present, and 3) that the device ID as assigned by the device manufacturer (identified by the Vendor ID field) is present.

In this example embodiment, the device certificate can be required to comply to the SPDM device certificate security policies and can be signed by a valid certificate authority, where self-signed certificates are not acceptable due to security concerns. The certificate can use an "other name" field within Subject Alternate Name to provide information regarding the manufacturer, product and serial number.

An example workflow is disclosed herein that includes part of the existing ARP discovery protocol. Additional steps provide an example of a proposed extension to the ARP discovery process that can be used to discover the endpoint security capabilities, and include the requester requesting the "Get SPDM Capabilities" command from the responder, the requester checking if the device is SPDM capable, and if the device supports security specifications as per SPDM protocol, then the requester sends the "Get Certificate" command to the endpoint device and the responder returns the device certificate. Otherwise, the device is classified as not supporting the security capabilities and ARP discovery continues. The requester can then verify the endpoint device certificate against a management controller authentication and authorization policy, such as discussed herein. The device certificate can be stored in the whitelist certificate trust store if this step is successful, otherwise it can be stored in the blacklist certificate store.

In another example embodiment, original equipment manufacturer (OEM)-specific PLDM functions for reading device security capabilities are provided. Assuming a leader/follower protocol has been implemented, the PLDM also determines 1) whether the devices support appropriate PLDM base capabilities via PLDM GetPLDMCommands command and conform to PMCI SPDM security specifications, and 2) whether OEM extension OEMDeviceSecurityCapbilities commands perform with devices to GetDigest and GetCertificate. The workflow includes an extension to an existing PLDM device discovery process, where the requester sends the "GET SPDM CAPABILITIES" OEM PLDM command to get the device capabilities. The endpoint device responds with device SPDM support details. The requester then checks if the device is capable of SPDM security capabilities. If the device supports the SPDM security functions, the process continues, otherwise device discovery continues. If the process continues, the requester sends a command to get the device certificate and the device responds with the device certificate. The requester then checks whether the certificate verifies the endpoint device certificate against the management controller authentication and authorization policy as previously discussed. The device certificate is stored in the whitelist certificate trust store only if this step is successful, otherwise it is stored in the blacklist certificate store.

The present disclosure provides a number of important technical innovations. One important technical innovation is a certificate authorization policy for SPDM-capable endpoint devices, which allows such devices to implement certificate authorization. Another important technical innovation is the extension of the SMBUS ARP protocol discovery process to read the device security capabilities and certificate status to mitigate risks from malicious firmware/hardware devices attempting to exploit a platform management component interconnect communication. Another important technical innovation is enhanced OEM-specific PLDM functions to discover the device security capabilities by extending the PLDM device discovery process. These technical innovations and others will benefit first implementers of the SPDM protocol within the industry, by enabling secure communications between the platform components and interfaces.

FIG. 1 is a diagram of an information handling system 100 for endpoint device security capabilities discovery, in accordance with an example embodiment of the present disclosure. System 100 includes managed device 102, management controller 104, platform 106, host interface 108, physical interface 110, PCIE 112, system management bus and security policy 114, RMII based transport 116, serial interface 118, keyboard control style interface 120, network interface 122, operating system 124, BIOS 126 and UEFI 128, each of which can be implemented in hardware or a suitable combination of hardware and software.

Managed device 102 can be implemented as one or more algorithms that are loaded on a processor and which configure the processor to be queried and to provide SPDM capabilities and certificates, and to perform other actions as discussed herein. Management controller 104 can be implemented as one or more algorithms that are loaded on a processor and which configure the processor to query a device such as managed device 102, to receive SPDM capabilities and certificates from the device, and to perform other actions as discussed herein. Management controller 104 provides for out-of-band monitoring, management, and control of the respective components of information handling system 100, such as cooling fan speed control, power supply management, hot-swap and hot-plug management, firmware management and update management for system BIOS 126 or UEFI 128, an option ROM, device firmware, and the like, or other system management and control functions as needed or desired. As such, management controller 104 provides some or all of the functions and features of the management controllers described herein.

Platform 106, host interface 108, physical interface 110, PCIE 112, RMII based transport 116, serial interface 118, keyboard control style interface 120, network interface 122, operating system 124, BIOS 126 and UEFI 128 have functions as described further herein. PCIE 112 can provide peripheral component interconnect express functionality, as known in the art and as discussed herein. BIOS 126 can provide basic input-output system functionality, as known in the art and as discussed further herein. RMII based transport 116 can provide reduced media-independent interface functionality, as known in the art and as discussed further herein. UEFI 128 can provide unified extensible firmware interface functionality, as known in the art and as discussed further herein.

System management bus and security policy 114 can be implemented as one or more algorithms that are loaded on a processor and which configure the processor to determine whether a device should be placed on a white list or a black list, and to perform other functions as discussed and described herein.

In operation, system 100 allows management controller 104 to protect against non-compliant devices and to mitigate risks from malicious firmware/hardware devices attempting to exploit a platform management component interconnect communication. Important characteristics of the management controller device authentication solution include enabling a management controller security policy for storing device certificates/public keys from trusted CAs, extending the SMBUS ARP protocol discovery process to read the device security capabilities and certificate status, providing generic OEM PLDM functions to read the device security capabilities for non-supported SMBUS protocol and other suitable functions.

Figure 2:
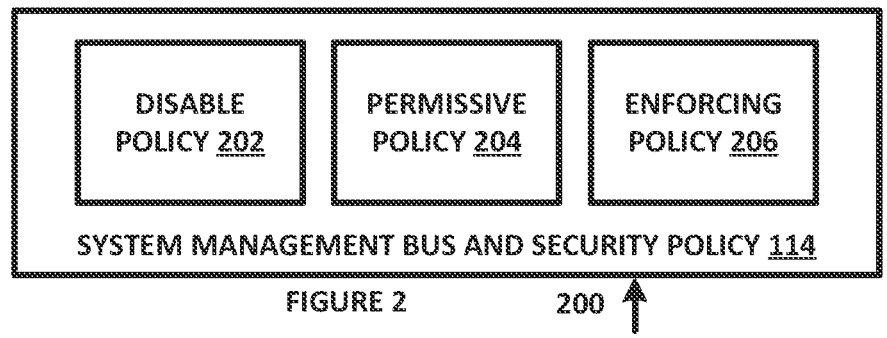
FIG. 2 is a diagram of a system for management controller security policy, in accordance with an example embodiment of the present disclosure.

FIG. 2 is a diagram of a system 200 for management controller security policy, in accordance with an example embodiment of the present disclosure. System 200 includes system management bus and security policy 114 and disable policy 202, permissive policy 204 and enforcing policy 206.

Disable policy 202 can be implemented as one or more algorithms that are loaded on a processor and which configure the processor to disable the security policy process. In one example embodiment, disable policy 202 can be used where a security policy can be temporarily disabled.

Permissive policy 204 can be implemented as one or more algorithms that are loaded on a processor and which configure the processor to generate a warning if it is determined that a security policy and data model is unsupported, that a security policy and data model certificate authority is unknown, or if other predetermined conditions exist. Permissive policy 204 can be further configured to determine whether a challenge failure has occurred on a device that supports a security policy and data model, whether the device should be quarantined and other suitable functions as discussed herein.

Enforcing policy 206 can be implemented as one or more algorithms that are loaded on a processor and which configure the processor to quarantine a device that does not authenticate successfully with a security policy and data model, that does not have a certificate that is signed by known trusted certificate authority, and to perform other suitable functions. When a device is quarantined, a user interface control can be generated to allow a user to add a root certificate authority for a device to a trusted certificate authority store, to add devices that do not support the security policy and data model to a white list or to perform other suitable functions.

Figure 3:
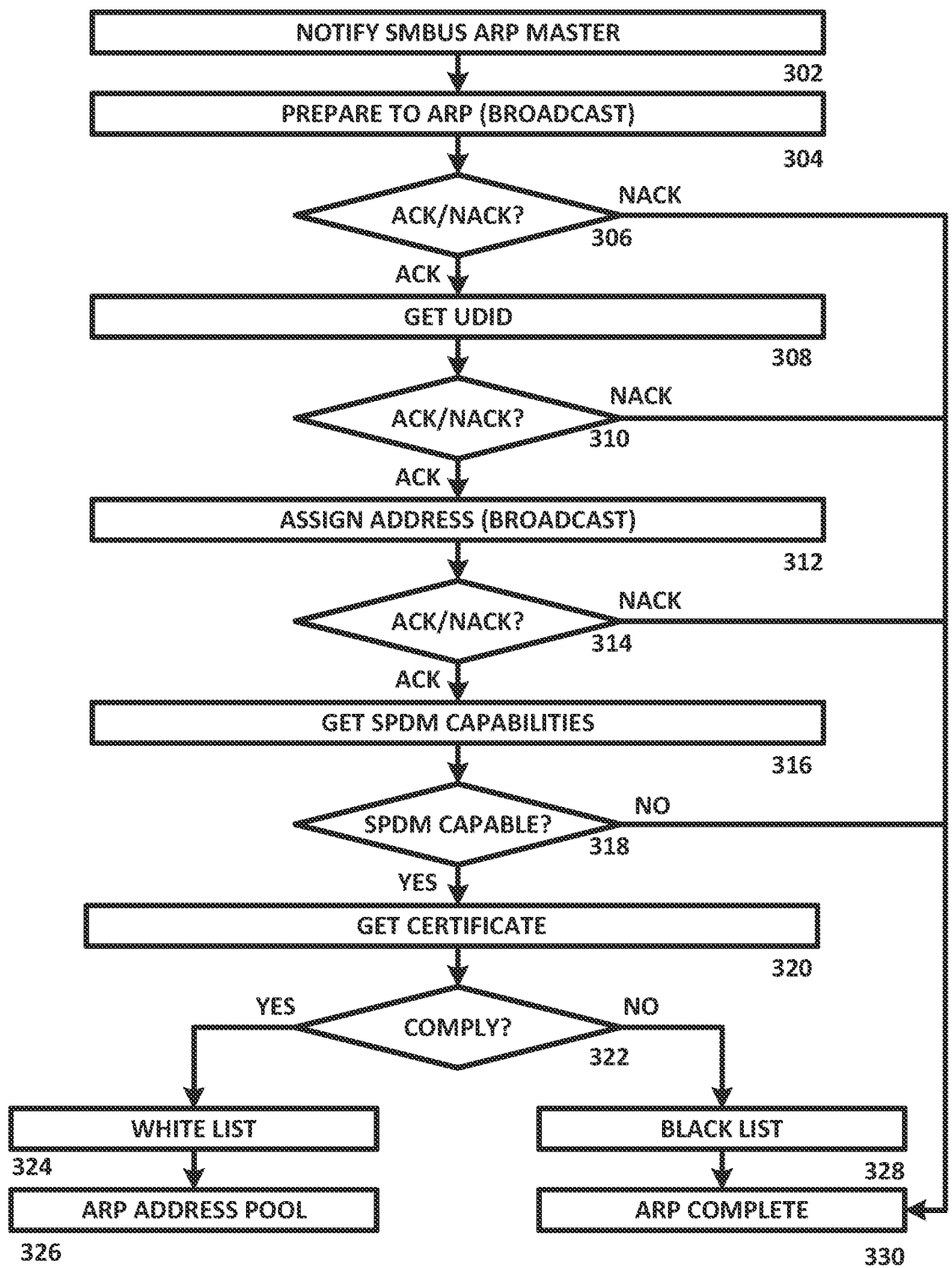
FIG. 3 is a flow chart of an algorithm for device discovery of security capabilities, in accordance with an example embodiment of the present disclosure.

FIG. 3 is a flow chart of an algorithm 300 for device discovery of security capabilities, in accordance with an example embodiment of the present disclosure. Algorithm 300 can be implemented on one or more processors.

Algorithm 300 begins at 302, where a system management bus address resolution protocol leader is notified. In one example embodiment, a leader/follower protocol can be used to implement an address resolution protocol on a processor or other suitable processes can also or alternatively be used. The algorithm then proceeds to 304.

At 304, an address resolution protocol is prepared. In one example embodiment, the address resolution protocol can be a communication protocol that operates on the processor and is used for discovering the link layer address, such as a MAC address, associated with a given Internet layer address, typically an IPv4 address. Other suitable processes can also or alternatively be performed. The algorithm then proceeds to 306.

At 306, it is determined whether an acknowledgement or a negative acknowledgement has been received, such as by one or more algorithms operating on the processor that monitor data messages. If a negative acknowledgement has been received, the algorithm proceeds to 330 and terminates. Otherwise, if an acknowledgement has been received, the algorithm then proceeds to 308.

At 308, a unique device identifier (UDID) or other suitable data is obtained, such as from a managed device by one or more algorithms operating on the processor. In one example embodiment, the UDID can be a unique identifier for a single device that is obtained from a server when a user tries to activate the device using a cloud service, a setup application or other suitable processes. The algorithm then proceeds to 310.

At 310, it is determined whether an acknowledgement or a negative acknowledgement has been received, such as by one or more algorithms operating on the processor that monitor data messages. If a negative acknowledgement has been received, the algorithm proceeds to 330 and terminates. Otherwise, if an acknowledgement has been received, the algorithm then proceeds to 312.

At 312, an address is assigned to the device. In one example embodiment, the address can include a network address or other suitable addresses, which can be assigned by one or more algorithms operating on the processor that are configured to assign addresses to managed devices on a network. The algorithm then proceeds to 314.

At 314, it is determined whether an acknowledgement or a negative acknowledgement has been received, such as by one or more algorithms operating on the processor that monitor data messages. If a negative acknowledgement has been received, the algorithm proceeds to 330 and terminates. Otherwise, if an acknowledgement has been received, the algorithm then proceeds to 316.

At 316, security policy and data model capabilities of a device are obtained. In one example embodiment, a data message can be generated by an algorithm operating on a processor of a requester at a management controller and transmitted to the device, where the data message includes one or more controls that cause the device to respond with security policy and data model capabilities, or other suitable processes can also or alternatively be performed. The algorithm then proceeds to 318.

At 318, it is determined whether the device is capable of functioning with the security policy and data model. In one example embodiment, the security policy and data model capabilities of the device can be compared to one or more parameters by an algorithm operating on the processor, or other suitable processes can also or alternatively be performed. The algorithm then proceeds to 320.

At 320, a certificate is obtained. In one example embodiment, the certificate can be provided in response to a data message that contains a request for a certificate generated by the processor and transmitted to the managed device, or in other suitable manners. The algorithm then proceeds to 322.

At 322, it is determined whether the certificate complies with the security policy and data model, such as by one or more algorithms operating on the processor that compare the certificate to one or more predetermined parameters, as discussed herein. If it is determined that the certificate does not comply, the algorithm proceeds to 328. Otherwise, the algorithm then proceeds to 324.

At 324, a white list entry is generated. In one example embodiment, the white list entry can be provided by one or more algorithms operating on the processor to a certificate trust store database, and can include a UUID, a device certificate signature and other suitable data. The algorithm then proceeds to 326, where an ARP address pool data store is generated.

At 328, a black list entry is generated. In one example embodiment, the black list entry can be provided to a certificate trust store database, and can include a UUID, a device certificate signature and other suitable data. The algorithm then proceeds to 330, where the ARP is completed and the algorithm terminates.

In operation, algorithm 300 provides for device discovery of security capabilities, such as in a network environment. Although algorithm 300 is shown as a flow chart, one of skill in the art will recognize that it can also or alternatively be implemented as an object oriented diagram, a state diagram, a ladder diagram or in other suitable manners.

Figure 4:
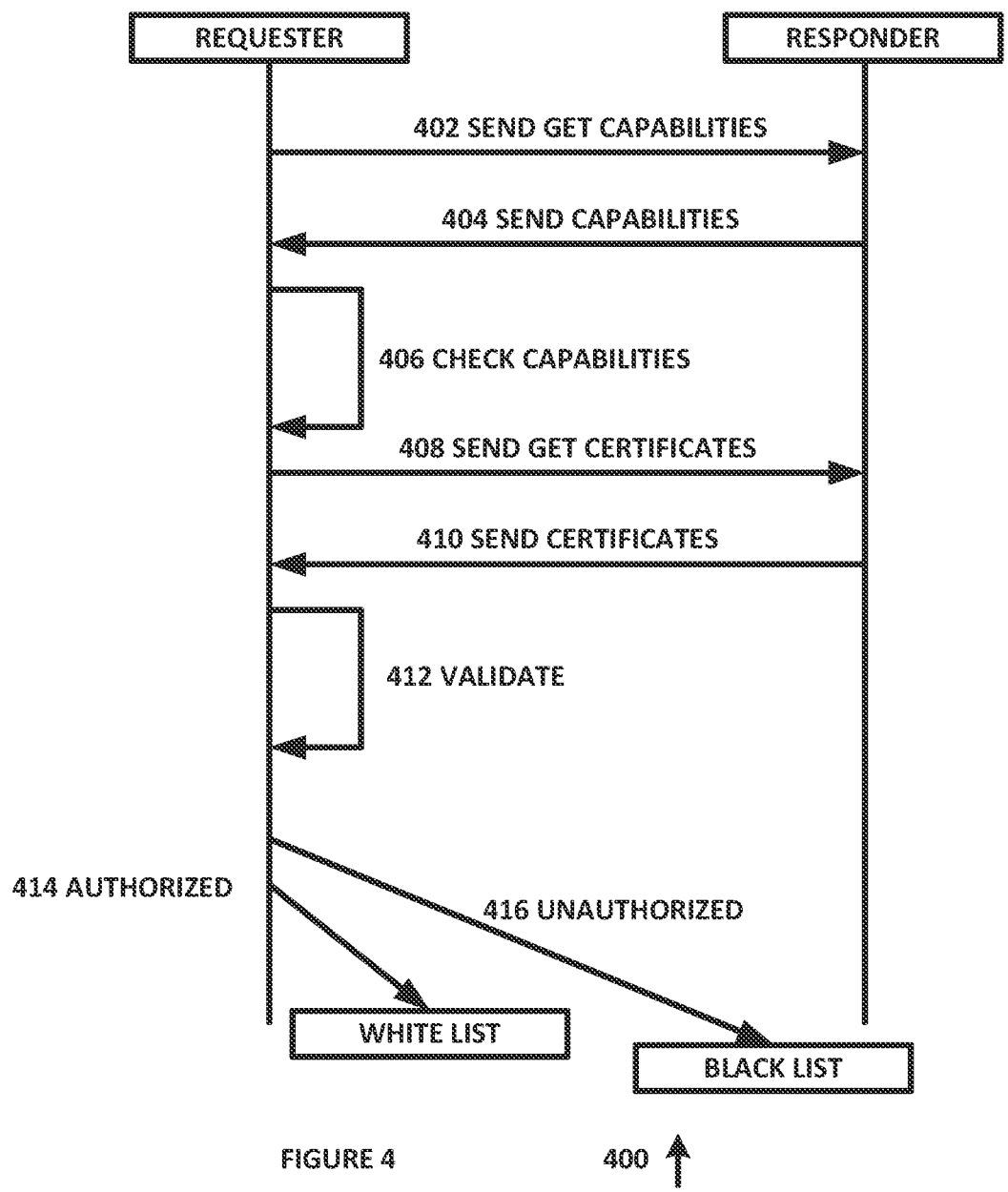
FIG. 4 is a flow chart of an algorithm for OEM-specific device discovery of security capabilities, in accordance with an example embodiment of the present disclosure.

FIG. 4 is a flow chart of an algorithm 400 for OEM-specific device discovery of security capabilities, in accordance with an example embodiment of the present disclosure. Algorithm 400 can be implemented on one or more processors.

Algorithm 400 begins at 402, where one or more algorithms operating on a processor that functions as a requester sends a data message that is formatted as a "GET SPDM CAPABILITIES" OEM PLDM command to get device capabilities of a separate device that can receive and process data messages. Other suitable commands and processes can also or alternatively be used. The algorithm then proceeds to 404.

At 404, a responder at a managed device that operates under control of one or more algorithms causes the managed device to respond with device SPDM support details. In one example embodiment, the managed device can receive and process the "GET SPDM CAPABILITIES" OEM PLDM command, or can perform other suitable processes. The algorithm then proceeds to 406.

At 406, the requester device operates under algorithmic control to receive the response and to determine whether the responding device is capable of SPDM security capabilities. If the requester device determines that the responding device does not support the SPDM security functions as a result of those algorithmic processes, the discovery process continues. Otherwise, the algorithm then proceeds to 408.

At 408, the requesting device operates under algorithmic control to format and send a data message that includes a command that causes the receiving device to obtain a device certificate and to respond with the device certificate. The algorithm then proceeds to 410.

At 410, the responding device operates under algorithmic control to format and send a data message that includes a device security certificate that can be used to decrypt encrypted data. The algorithm then proceeds to 412.

At 412, the requesting device operates under algorithmic control to determine whether the certificate provided by the responding device is validated. In one example embodiment, a management controller authentication and authorization policy can be used by the processor to validate the certificate or other suitable processes can also or alternatively be used. The algorithm then proceeds to 414 or 416.

At 414, if it is determined that the responding device has been validated, such as by the processor operating under algorithmic control, the device certificate is stored in a white list certificate trust store, or other in suitable manners.

At 416, if it is determined that the responding device has not been validated, such as by the processor operating under algorithmic control, the device certificate is stored in an unauthorized certificate list or black list.

In operation, algorithm 400 provides for OEM-specific device discovery of security capabilities, such as in a network environment. Although algorithm 400 is shown as a ladder diagram, one of skill in the art will recognize that it can also or alternatively be implemented as an object oriented diagram, a state diagram, a flow chart or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data processing on device security capabilities, comprising:

a management controller operating on a hardware processor and configured to load and execute one or more algorithms that provide the function of transmitting a request to a managed device using a protocol and to receive a response from the managed device; and
 a security policy system operating on the hardware processor and in response to determining that the managed device is non-compliant with one or more original equipment manufacturer functions that discover the device security capabilities, the security policy system configured to execute the one or more algorithms to process a device certificate and to apply a security policy to the managed device certificate based on a system management bus discovery protocol.

2. The system of claim 1 wherein the security policy system further comprises a disable policy system operating on the processor and configured to suspend application of a Security Protocol and Data Model protocol (SPDM) security policy if the device certificate is on a white list.

3. The system of claim 2 wherein the security policy system further comprises a permissive policy operating on the processor and configured to execute one or more algorithms to quarantine the device if it fails to comply with the SPDM security policy if the device certificate in on a black list.

4. The system of claim 1 wherein the security policy system further comprises an enforcing policy operating on the processor and configured to execute one or more algorithms to determine whether the device certificate is signed by a predetermined certificate authority.

5. The system of claim 1 wherein the security policy system is configured to store the device certificate from a certificate authority.

6. The system of claim 1 wherein the security policy system is configured to store a public key for the device certificate from a certificate authority.

7. The system of claim 1 wherein the security policy system is configured to implement a discovery process to read device security capabilities of a device.

8. The system of claim 1 wherein the security policy system is configured to implement a discovery process to read a certificate status of the device certificate.

9. The system of claim 1 wherein the security policy system is configured to implement platform level data model functions to read device security protocols of a device.

10. A method for data processing on device security capabilities, comprising:

transmitting a request to a managed device using a protocol from a management controller operating on a processor under algorithmic control;
 receiving a response from the managed device at the processor;
 in response to determining that the device is non-compliant with one or more original equipment manufacturer functions that discover the device security capabilities, processing the response from the management device to apply a security policy to a management device certificate using a security policy system operating on the processor and a system management bus based on a system management bus discovery protocol.

11. The method of claim 10 further comprising suspending application of a Security Protocol and Data Model protocol (SPDM) security policy in response to a disable control function.

12. The method of claim 11 further comprising quarantining the managed device certificate if it fails to comply with the SPDM security policy.

13. The method of claim 10 further comprising determining whether the device certificate is signed by a predetermined certificate authority.

14. The method of claim 13 further comprising storing the device certificate if it is determined that the device has provided the device certificate.

15. The method of claim 13 further comprising quarantining the device if it is determined that the device has failed to provide the device certificate.

16. The method of claim 13 further comprising placing the device on a black list if it is determined that the device has failed to provide the certificate.

17. The method of claim 10 further comprising storing a public key for the device from a certificate authority.

18. The method of claim 10 further comprising reading device security capabilities of the device.

19. The method of claim 10 further comprising reading a certificate status of the device.

20. The method of claim 10 further comprising reading a device security protocol of the device.

* * * * *